(12) United States Patent
Sion (10) Patent No.: US 11,363,415 B2
(45) Date of Patent: Jun. 14, 2022

(54) SENSOR-BASED LOCATION DETERMINATION AND DYNAMIC ROUTING

(71) Applicants: BRINGG DELIVERY TECHNOLOGIES LTD., Tel Aviv (IL); Lior Sion, Tel Aviv (IL)

(72) Inventor: Lior Sion, Tel Aviv (IL)

(73) Assignee: BRINGG DELIVERY TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 16/763,218

(22) PCT Filed: Nov. 12, 2018

(86) PCT No.: PCT/US2018/060580
§ 371 (c)(1),
(2) Date: May 11, 2020

(87) PCT Pub. No.: WO2019/094870
PCT Pub. Date: May 16, 2019

(65) Prior Publication Data
US 2021/0076161 A1  Mar. 11, 2021

Related U.S. Application Data

(60) Provisional application No. 62/584,813, filed on Nov. 11, 2017.

(51) Int. Cl.
*H04W 4/029* (2018.01)
*H04W 4/40* (2018.01)
*H04W 76/10* (2018.01)

(52) U.S. Cl.
CPC ............ *H04W 4/029* (2018.02); *H04W 4/40* (2018.02); *H04W 76/10* (2018.02)

(58) Field of Classification Search
None
See application file for complete search history.

(56) References Cited

U.S. PATENT DOCUMENTS

| 2008/0140479 A1* | 6/2008 | Mello | ................ G06Q 30/0261 705/14.54 |
| 2014/0142834 A1* | 5/2014 | Maitra | ............... G01C 21/3423 701/117 |

* cited by examiner

*Primary Examiner* — Adolf Dsouza
(74) *Attorney, Agent, or Firm* — FisherBroyles, LLP; Ariel Reinitz (57) ABSTRACT

Systems and methods are disclosed for location determination and dynamic routing. In one implementation, a first request corresponding to a first location identifier is received. The first request is assigned based on a location of a first device. A second location identifier is received in conjunction with a fulfillment of the first request and based on a perception of one or more access points by one or more sensors of the first device. The second location identifier is associated with the first location identifier. A second request corresponding to the first location identifier is received. The second request is assigned to the second device with respect to the second location identifier based on input(s) originating from sensor(s) of a second device and an association, with respect to the fulfillment of the first request, of the second location identifier with the first location identifier.

20 Claims, 5 Drawing Sheets

SENSOR-BASED LOCATION DETERMINATION AND DYNAMIC ROUTING

CROSS-REFERENCE TO RELATED APPLICATION

This application is related to and claims the benefit of U.S. Patent Application No. 62/584,813, filed Nov. 11, 2017, which is incorporated herein by reference in its entirety.

TECHNICAL FIELD

Aspects and implementations of the present disclosure relate to data processing, and more specifically, to sensor-based location determination and dynamic routing.

BACKGROUND

Various devices, such as smartphones, tablet devices, portable computers, etc., can incorporate multiple sensors. Such sensors can receive and/or provide inputs/outputs that reflect what is perceived by the sensor.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to sensor-based location determination and dynamic routing. Technologies are described herein that enable various determinations to be computed based on/in relation to inputs originating at various sensors of a device. Based on these (and/or other inputs) various location-based services (which may utilize such device(s)) can be improved and/or otherwise optimized.

For example, based on various determinations associated with various initial delivery instance(s), subsequent delivery instances to the same/similar location can be improved. By way of illustration, a delivery directed to a particular physical location may initially be directed to or associated with a mailing address of such a location. However, the geographic location of such a mailing address (e.g., as reflected when input into a navigation or mapping application) may not be the ideal/preferred location at which to perform/complete the referenced delivery.

For example, when navigating to the geographic coordinates associated with the entrance of a large building/complex, no parking may be available at such a location (e.g., the front door of a large mall, hospital etc.). Additionally, in certain implementations the actual location of the delivery site (e.g., within a large building/complex) may be far from the location reflected by the mailing address, etc. (requiting a delivery person to expend considerable additional time walking within the building). It can be appreciated that existing technologies—which may route users/drivers to the referenced mailing address location—can cause considerable inefficiencies as drivers may need to independently seek parking or delivery entrances after being routed to the front door of a building, mall, etc. (through which deliveries may not be able to be made).

Accordingly, described herein in various implementations are technologies that utilize inputs originating from various sensors, communication interfaces, etc., to track the manner in which deliveries are performed, e.g., at a particular location, address, etc. For example, while a driver may initially be routed to the front door/entrance of a building, it may not be advantageous (or possible) to perform the referenced delivery at such a location. The described technologies can be configured to monitor the manner in which the driver navigates to another area (e.g., a parking lot, loading dock, etc.) as well as the manner in which the driver navigates within the delivery location (e.g., walking across the length of a large building, up/down several levels, etc.). Based on various sensor inputs, determinations, etc., received with respect to such delivery instance(s) (reflecting, for example, the location at which the delivering user parked, walked, etc., in order to perform the initial delivery), subsequent deliveries to the same/similar address can be further improved/optimized to account for such determinations.

Accordingly, it can be appreciated that the described technologies are directed to and address specific technical challenges and longstanding deficiencies in multiple technical areas, including but not limited to sensor-based location determination, route optimization, and data management. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., (e.g., sensors, interfaces, etc.) operate to enable, improve, and/or enhance the described technologies, such as in a manner described herein.

Figure 1:
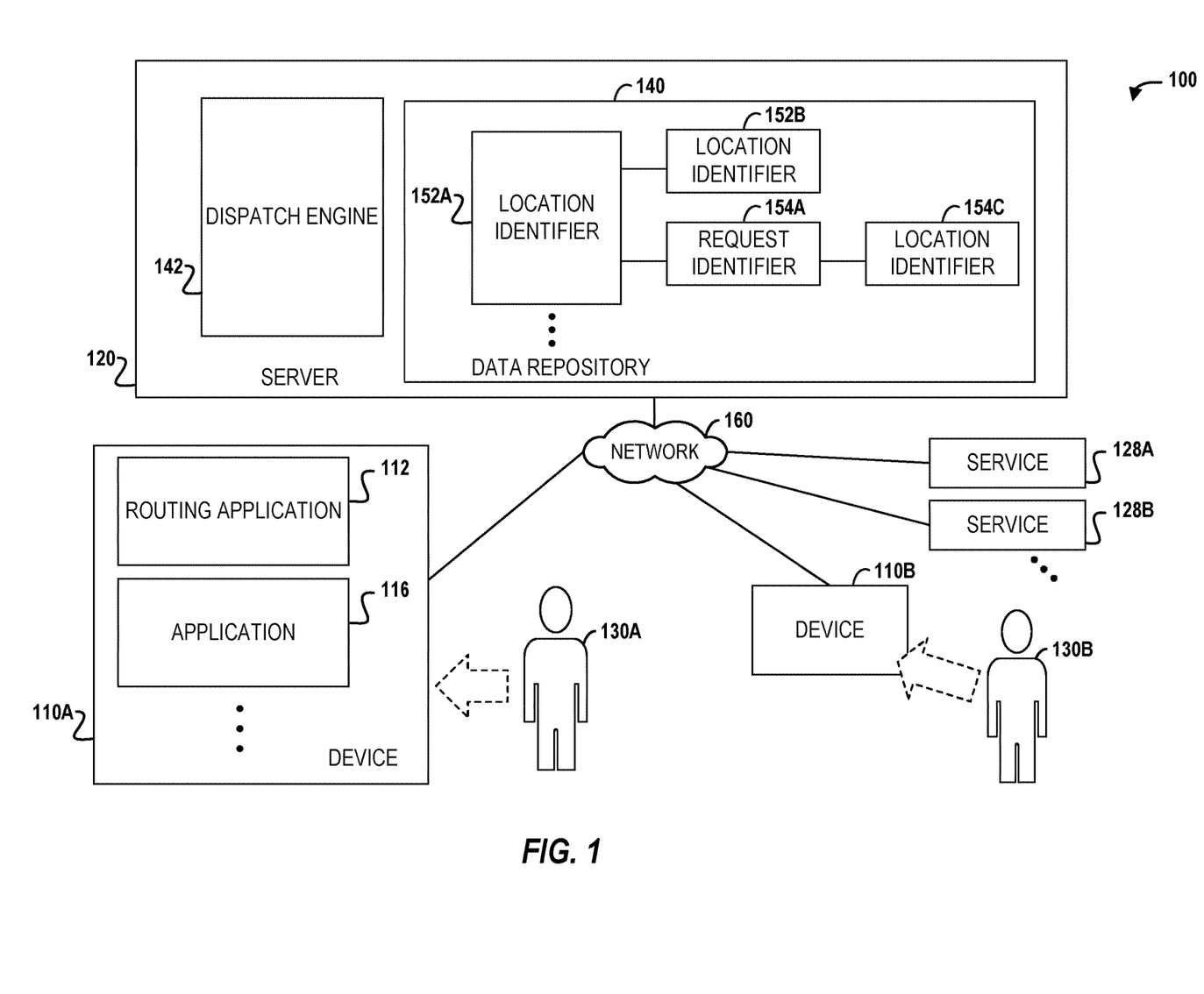
FIG. 1 illustrates an example system, in accordance with an example embodiment.

FIG. 1 depicts an illustrative system 100, in accordance with some implementations. As shown, system 100 includes device 110A and device 110B (collectively, devices 110), server 120, and services 128A and 128B (collectively, services 128). These (and other) elements or components can be connected to one another via network 160, which can be a public network (e.g., the Internet), a private network (e.g., a local area network (LAN) or wide area network (WAN)), or a combination thereof. Additionally, in certain implementations various elements may communicate and/or otherwise interface with one another.

Each of the referenced devices 110 can be, for example, a laptop computer, a desktop computer, a terminal, a mobile phone, a tablet computer, a smart watch, a personal digital assistant (PDA), a digital music player, a server, a wearable device, a virtual reality device, an augmented reality device, a holographic device, and the like. User 130A and user 130B (collectively, users 130) can be human users who interact with devices such as device 110A and device 110B, respectively. For example, user 130A can provide various inputs (e.g., via an input device/interface such as a keyboard, mouse, touchscreen, microphone—e.g., for voice/audio inputs, etc.) to device 110A. Device 110A can also display, project, and/or otherwise provide content to user 130A (e.g., via output components such as a screen, speaker, etc.).

Figure 2:
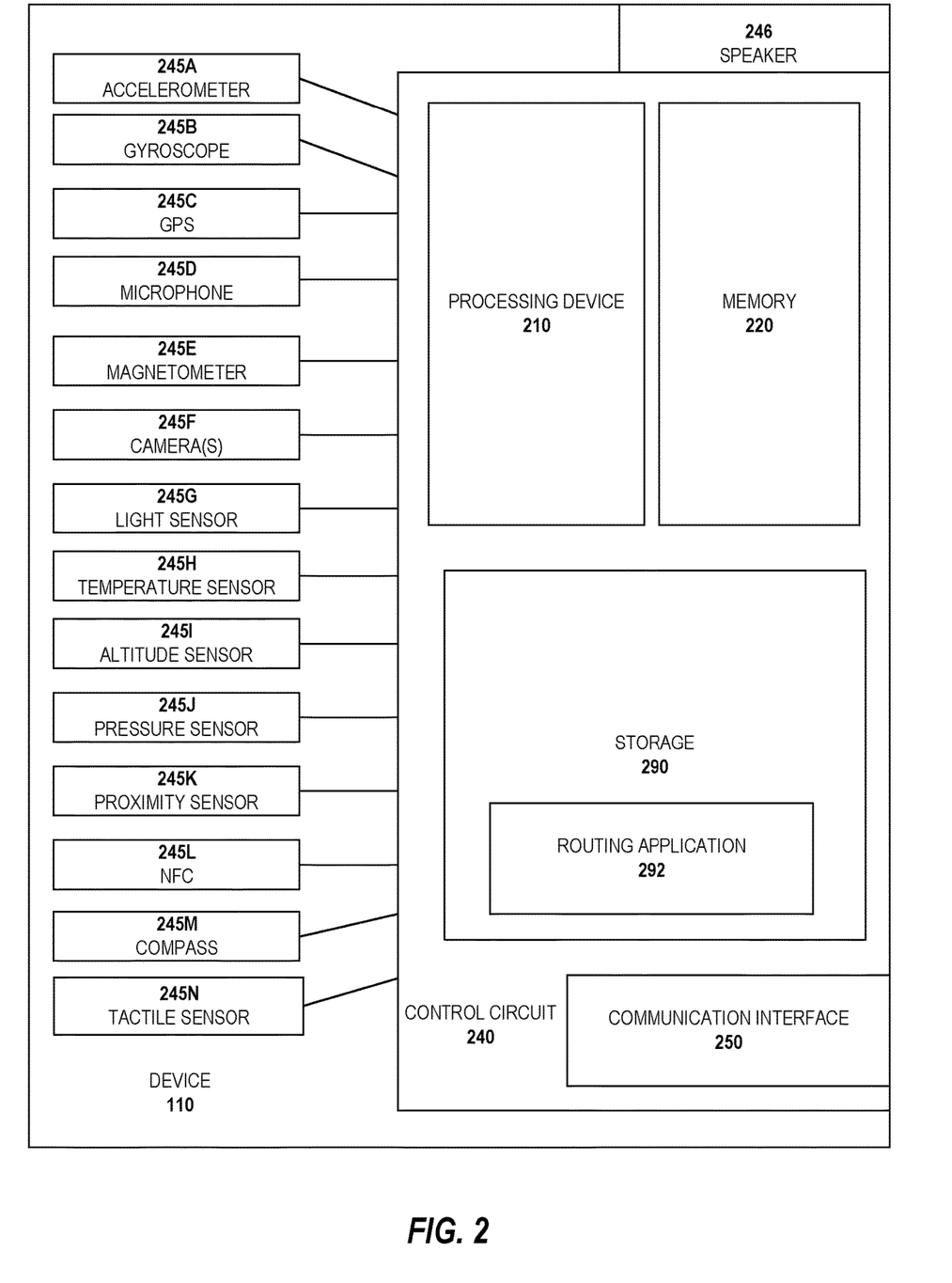
FIG. 2 illustrates an example device, in accordance with an example embodiment.
Figure 5:
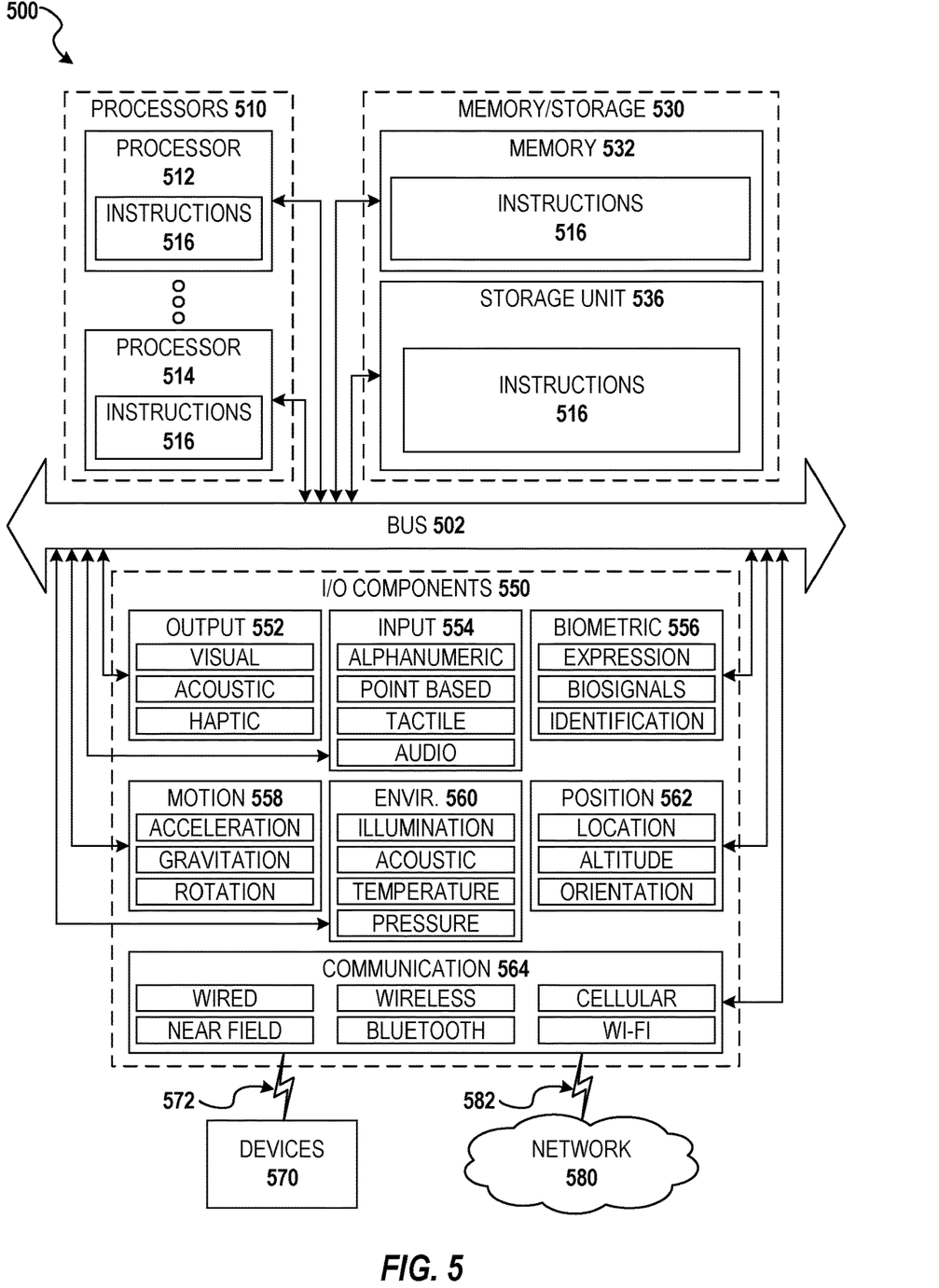
FIG. 5 is a block diagram illustrating components of a machine able to read instructions from a machine-readable medium and perform any of the methodologies discussed herein, according to an example embodiment.

It should be understood that, in certain implementations, devices 110 can also include and/or incorporate various sensors and/or communications interfaces (including but not limited to those depicted in FIGS. 2 and 5 and/or described/referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. Additionally, in certain implementations devices 110 can be connected to and/or otherwise communicate with various peripheral devices.

As noted, in certain implementations, device(s) 110 can also include and/or incorporate various sensors and/or communications interfaces. By way of illustration, FIG. 2 depicts an example implementation of a device 110 (e.g., device 110A as shown in FIG. 1). As shown in FIG. 2, device 110 can include a control circuit 240 (e.g., a motherboard) which is operatively connected to various hardware and/or software components that serve to enable various operations, such as those described herein. Control circuit 240 can be operatively connected to processing device 210 and memory 220. Processing device 210 serves to execute instructions for software that can be loaded into memory 220. Processing device 210 can be a number of processors, a multi-processor core, or some other type of processor, depending on the particular implementation. Further, processor 210 can be implemented using a number of heterogeneous processor systems in which a main processor is present with secondary processors on a single chip. As another illustrative example, processor 210 can be a symmetric multi-processor system containing multiple processors of the same type.

Memory 220 and/or storage 290 may be accessible by processor 210, thereby enabling processing device 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

As shown in FIG. 2, storage 290 can store routing application 292. In certain implementations, routing application 292 can be, for example, instructions, an 'app,' etc., that can be loaded into memory 220 and/or executed by processing device 210, in order to enable a user of the device to interact with and/or otherwise utilize the technologies described herein (e.g., in conjunction with/communication with server 120).

A communication interface 250 is also operatively connected to control circuit 240. Communication interface 250 can be any interface (or multiple interfaces) that enables communication between user device 102 and one or more external devices, machines, services, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 110 to other computing devices, systems, services, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 110 can communicate with one or more other devices, systems, services, servers, etc., such as those depicted in FIG. 1 and/or described herein. Such devices, systems, services, servers, etc., can transmit and/or receive data to/from the user device 110, thereby enhancing the operation of the described technologies, such as is described in detail herein. It should be understood that the referenced devices, systems, services, servers, etc., can be in direct communication with user device 110, indirect communication with user device 110, constant/ongoing communication with user device 110, periodic communication with user device 110, and/or can be communicatively coordinated with user device 110, as described herein.

Also connected to and/or in communication with control circuit 240 of user device 110 are one or more sensors 245A-245N (collectively, sensors 245). Sensors 245 can be various components, devices, and/or receivers that can be incorporated/integrated within and/or in communication with user device 110. Sensors 245 can be configured to detect one or more stimuli, phenomena, or any other such inputs, described herein. Examples of such sensors 245 include, but are not limited to: accelerometer 245A, gyroscope 245B, GPS receiver 245C, microphone 245D, magnetometer 245E, camera 245F, light sensor 245G, temperature sensor 245H, altitude sensor 245I, pressure sensor 245J, proximity sensor 245K, near-field communication (NFC) device 245L, compass 245M, and tactile sensor 245N. As described herein, device 110 can perceive/receive various inputs from sensors 245 and such inputs can be used to initiate, enable, and/or enhance various operations and/or aspects thereof, such as is described herein.

At this juncture it should be noted that while the foregoing description (e.g., with respect to sensors 245) has been directed to user device 110, various other devices, systems, servers, services, etc. (such as are depicted in FIG. 1 and/or described herein) can similarly incorporate the components, elements, and/or capabilities described with respect to device 110. It should also be understood that certain aspects and implementations of various devices, systems, servers, services, etc., such as those depicted in FIG. 1 and/or described herein, are also described in greater detail below in relation to FIG. 5.

Server 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server 120 can include components such as dispatch engine 142 and data repository 140.

It should be understood that, in certain implementations, server 120 can also include and/or incorporate various sensors and/or communications interfaces (including but not limited to those depicted in FIG. 2 and described in relation to device(s) 110. The components can be combined together or separated in further components, according to a particular implementation. It should be noted that in some implementations, various components of server 120 may run on separate machines (for example, repository 140 can be a separate device). Moreover, some operations of certain of the components are described in more detail herein.

Data repository 140 can be hosted by one or more storage devices, such as main memory, magnetic or optical storage based disks, tapes or hard drives, NAS, SAN, and so forth. In some implementations, repository 140 can be a network-attached file server, while in other implementations repository 140 can be some other type of persistent storage such as an object-oriented database, a relational database, and so forth, that may be hosted by the server 120 or one or more different machines coupled to server 120 via the network 160, while in yet other implementations repository 140 may be a database that is hosted by another entity and made accessible to server 120. In other implementations, repository 140 can be implemented within a distributed or decentralized system/environment (e.g., using blockchain, distributed ledger technology (DLT) and/or other decentralized or distributed computing/storage technologies).

In certain implementations, repository 140 can store data pertaining to and/or otherwise associated with various requests, locations, and/or other information. In certain implementations, such stored information can pertain to aspects of delivery requests (e.g., shipments for delivery, restaurant orders for delivery, etc.).

In certain implementations, such requests can originate and/or be received from various services such as service 128A and service 128B (collectively, services 128). Such services 128 can be, for example, third-party services that enable users to purchase goods for shipment, place restaurant/food orders for delivery, and/or any other such services. Accordingly, upon receiving an order (e.g., for food delivery, shipment of goods, etc.), such a service 128 can provide or transmit a request to server 120. Such a request can include, for example, a location identifier (e.g., location identifier 152A as shown in FIG. 1). Such a location identifier can include or reflect a location such as a street or mailing address to which a delivery, order, etc., is to be delivered. Additionally, in certain implementations the referenced request can include or reflect a request identifier (e.g., request identifier 154A, as shown in FIG. 1). Such a request identifier can include or reflect other aspects of a request such as the name of the recipient (e.g., a personal or business name) and/or other aspects associated with the request. As described here, the referenced location identifier(s), request identifier(s), etc., can be stored in repository 140, associated with one another, and/or utilized in improving the routing of deliveries to certain locations, as described herein.

Additionally, in certain implementations, repository 140 can store data pertaining to the various merchants, drivers, services, customers, orders, etc., that are handled/managed by the described technologies. For example, in certain implementations, repository 140 can store, maintain, track, and/or process various order/delivery histories, e.g., with respect to a particular merchant, customer, and/or driver. For example, it can be determined (based on a processing of a history associated with a particular merchant) that such a merchant sends out significantly more orders on Wednesday nights in the winter. Based on such a determination, the described technologies can enable additional drivers, etc. (e.g., from third party delivery services, etc.) to be utilized in order to keep up with the increased demand.

It should be understood that though FIG. 1 depicts server 120 and devices 110 as being discrete components, in various implementations any number of such components (and/or elements/functions thereof) can be combined, such as within a single component/system.

In certain implementations, various technologies disclosed herein can be configured to enable elastic delivery. Such elastic delivery can, for example, configure the described technologies to utilize real-time sensor inputs and other devices to enable the dynamic routing of delivery tasks/requests to various parties or workforces, such as may be organized within and/or outside an organization. In doing so, multiple delivery services (e.g., an internal delivery service organized within a company, a third-party deliver service, etc.) can be utilized under certain circumstances to address increases in demand, while providing a single platform through which customers, merchants, etc., can monitor, view status updates, manage deliveries, etc., even in scenarios where such deliveries may be completed by drivers from different organizations/services. In certain implementations, such technologies can encompass operations performed by and/or in conjunction with dispatch engine 142.

By way of illustration, a restaurant (with a delivery force of some size) can utilize the described technologies to allocate deliveries to the best driver for a particular job, such as based on a set of rules. In a scenario in which such a driver is not found (e.g., within the restaurant's workforce) the described technologies can identify/determine one or more other driver(s) (e.g., from other workforces) and dispatch or otherwise assign the delivery to such driver(s). Moreover, in certain implementations it can be determined whether a more ideal/advantageous driver is present/available (that is, more advantageous than the driver(s) available within a particular workforce), such as based on one or more rules. Such rules can reflect, for example, a cheaper driver, a driver with certain abilities (e.g., a doctor) and/or capacity (car vs. bicycles), etc. Additionally, the degree to which a driver has completed a current order can be accounted for (e.g., a more efficient driver that is currently performing a delivery but can be determined to be close to completing such a delivery can be assigned another delivery in lieu of routing the new delivery to another driver who may be less optimal for the new delivery). In certain implementations such rules, etc., can be determined based on inputs originating from various sensors such as those depicted and/or described herein.

In one example implementation, the described technologies can be employed with respect to a restaurant delivery service. In doing so, the service can allocate/assign each delivery order to a particular driver that is determined to be capable of performing the requested delivery (e.g., based on one or more rules, e.g., a time window, etc.). It should be understood that, as described herein, in certain scenarios such a driver may be selected from among a workforce of the restaurant from which the order originated, while in other scenarios such a driver may be part of another workforce (e.g., a third-party delivery service).

In certain implementations, the described technologies can also provide a single or unified user interface/experience, through which a user (e.g., a restaurant, merchant, etc., that is dispatching orders) can initiate, track, etc., deliveries, including those being completed by drivers from multiple workforces (e.g., the restaurant's own delivery workforce, third-party delivery services, etc.).

It should also be noted that while various aspects of the described technologies are described with respect to restaurant/retail deliveries, such descriptions are provided by way of example and the described technologies can also be applied in many other context, settings, and/or industries. For example, the described technologies can also be implemented in settings/contexts such as taxi service, drones, and/or any other such services, such as services that leverage the location and/or capabilities of various participants/candidates and route tasks, jobs, etc., to such devices, users, etc., in a manner that enables such tasks, etc., to be efficiently completed (and/or completed in a an effective manner, e.g., fastest, most cost effectively, etc.).

Additionally, as described herein, the described elastic delivery technologies can provide the customer receiving the order with a single, unified interface that can reflect activity pertaining to multiple orders being fulfilled by different delivery services.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 4:
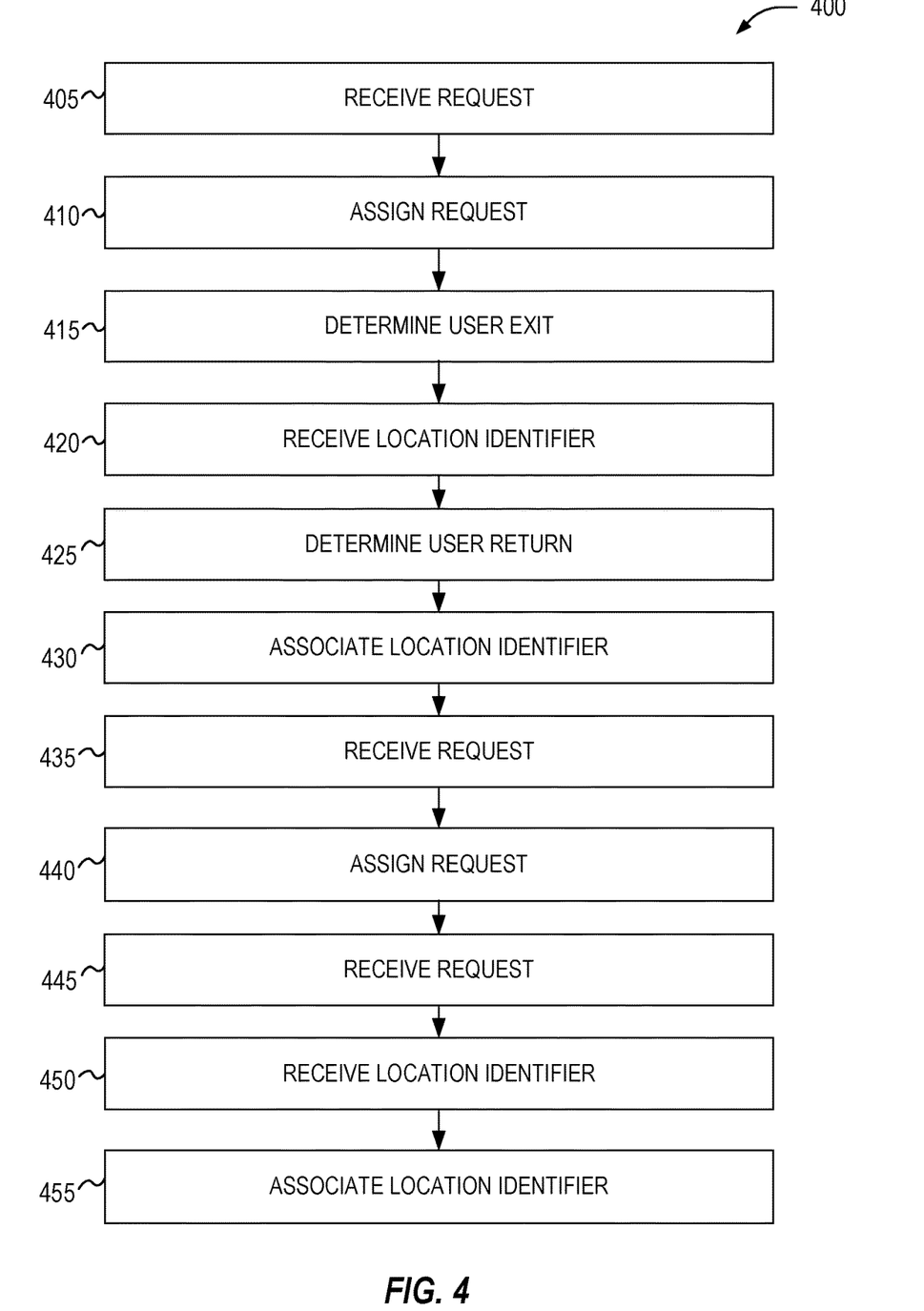
FIG. 4 is a flow chart illustrating a method, in accordance with example embodiments, for sensor-based location determination and dynamic routing.

FIG. 4 is a flow chart illustrating a method 400, according to an example embodiment, for sensor-based location determination and dynamic routing. The method is performed by processing logic that can comprise hardware (circuitry, dedicated logic, etc.), software (such as is run on a computing device such as those described herein), or a combination of both. In one implementation, the method 400 is performed by one or more elements depicted and/or described in relation to FIG. 1 (including but not limited to server 120, dispatch engine 142, and/or devices 110), while in some other implementations, the one or more blocks of FIG. 4 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
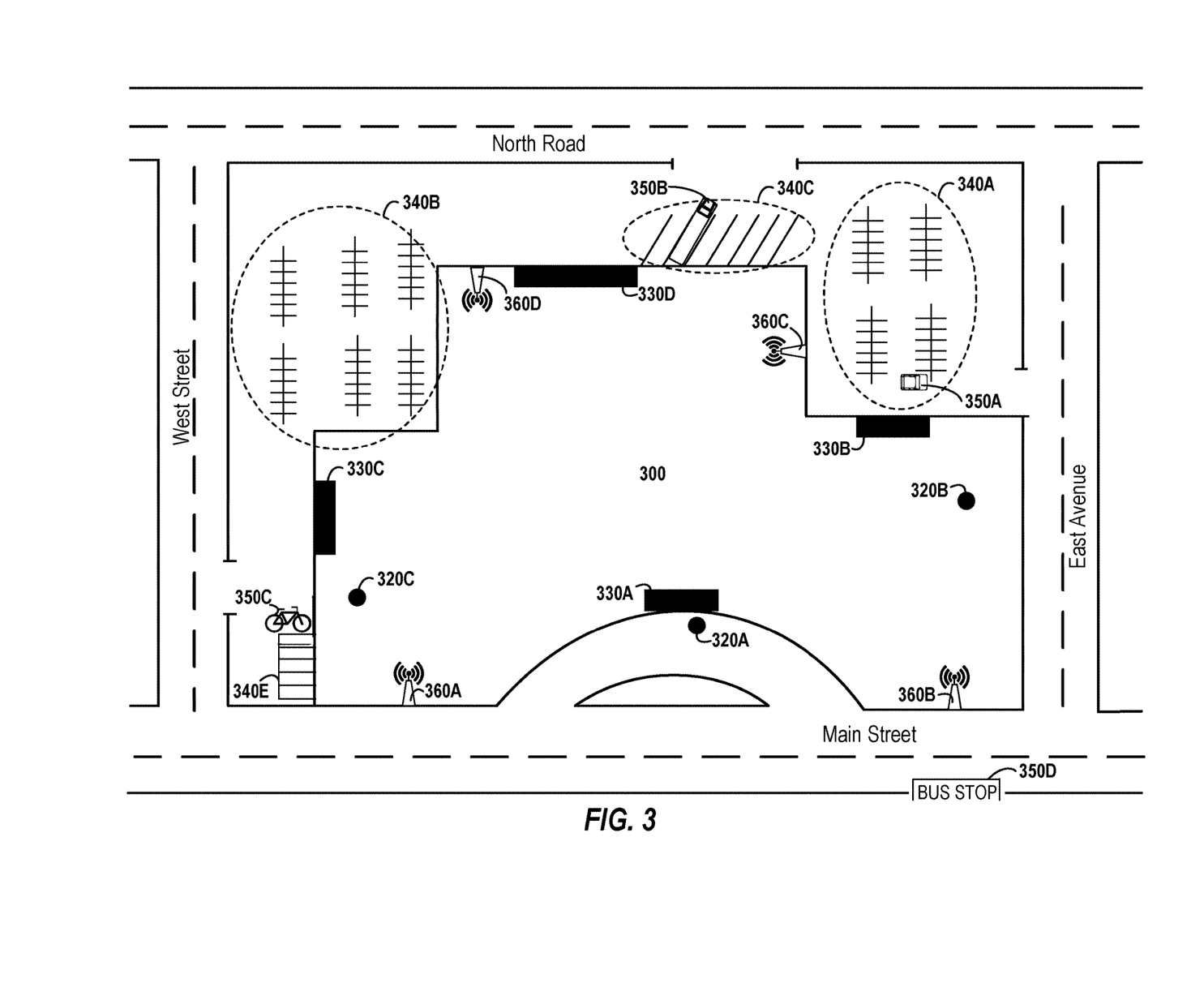
FIG. 3 depicts example scenarios described herein, according to example embodiments.

At operation 405 a first request is received. In certain implementations, such a request can correspond to a first location identifier (e.g., location identifier 152A, as shown in FIG. 1). For example, as shown in FIG. 1, a request can be received from a service 128 (e.g., a food delivery service) indicating that a driver or delivery person is needed to deliver an order from a restaurant to a customer. Such a request can include or reflect a location identifier such as a street address, geographic coordinates, etc. By way of illustration, FIG. 3 depicts an example scenario in which location 320A (corresponding to the front door 330A of a large building, structure, etc. 300, such as a hospital, shopping mall, etc.) shows the location of the referenced location identifier (here, the mailing address of the building). It can be appreciated that while building 300 may have multiple entrances (e.g., entrance 330B, 330C, etc., as shown in FIG. 3), the initial request may correspond to a specific location (e.g., the mailing address of the building 300, as reflected in a navigation or mapping application).

At operation 410, the first request is assigned. In certain implementations, such a request can be assigned to a particular user (e.g., driver, delivery person, etc.). Moreover, in certain implementations such a request can be assigned based on a location of a device 110 associated with such user (as determined based on inputs originating from various sensors of the device, e.g., GPS, etc.).

As described herein, in certain implementations such a request can be assigned based on various factors such as the location of the user/device in relation to the restaurant (from which the order originates), the location of the delivery, etc. For example, in certain implementations the referenced request (e.g., to deliver a product or order, to provide a service at the location, etc.) can be assigned to a user based on the proximity of the user to the location at which the order, etc. is to be delivered. Additionally, in certain implementations the referenced request can be assigned based on various additional factors, such as the capabilities of the driver and/or vehicle (e.g., whether the driver has certain training and/or equipment necessary to complete the order/provide the requested service, etc.).

Upon assigning the request, in certain implementations the referenced driver/vehicle can be routed to the location at which the order/service is to be delivered or provided. In certain implementations, such routing can be performed via a navigation or mapping application.

At operation 415, it is determined or otherwise computed that a user (e.g., the user to which the request was assigned at operation 410) has exited a vehicle and/or otherwise arrived at the site to which the delivery is to be performed. In certain implementations, such a determination can be computed based on various inputs such as those originating from a sensor of a first device 110.

In certain implementations, the referenced determination that the user has exited a vehicle can be determined based on changes to various network connections or interfaces perceptible to the device 110. For example, as shown in FIG. 3, upon arriving outside building 300, a driver may need to exit or dismount a vehicle in order to enter the building and complete the order/delivery. For example, the driver may park a car 350A, truck 350B, or bicycle 350C outside the building. In certain implementations, such vehicles may incorporate various network interfaces or connections, such as Bluetooth, Wifi, NFC, etc. through which the vehicle connects to or communicates with a device. Accordingly, upon determining that such connections have changed or terminated, it can be further determined that the user has exited the vehicle (e.g., to perform the delivery, request, etc.).

By way of further example, in various implementations the described technologies can be configured to determine and/or compute the amount of time a driver, vehicle, etc. is on site (e.g., on the premises at which a delivery is being performed). Such time on site can be calculated and utilized, e.g., to project the amount of time that may be necessary for subsequent comparable orders/requests. Accordingly, upon determining that a driver has arrived at the referenced location (and exited the vehicle), the referenced 'time on site' can be computed. It should be understood that such a delivery, order, request, etc., can be determined to be competed when the referenced connection or communication interface (e.g., corresponding to the vehicle) is perceptible again, the network connection is restored, etc. By way of further example, in various implementations the described technologies can be configured to determine and/or compute the time of arrival of a driver, vehicle, etc. (e.g., at the premises at which a delivery is being performed), e.g., in a manner described herein.

By way of further example, in various implementations the described technologies can be configured to determine and/or compute how long to allow (e.g., from the time a driver or vehicle arrives at one delivery location) until the next job is assigned to the driver (e.g., based on various aspects or inputs associated with the premises at which a first delivery is being performed), e.g., as described herein.

It should also be noted that, in certain implementations the referenced deliveries, orders, requests, etc., can be fulfilled by users traveling via public transportation (e.g., subway, bus, etc.). By way of illustration, as shown in FIG. 3, the arrival of a user to bus stop 350D can reflect that the user has arrived in the vicinity of building 300 (e.g., to deliver an order, etc.).

At operation 420 a second location identifier is received. In certain implementations, such a second location identifier can be received in conjunction with a fulfillment of the first request (e.g., the request received at operation 405). Additionally, in certain implementations such a second location identifier can be received from the first device (e.g., the device to which the first request was assigned, e.g., at operation 410). Moreover, in certain implementations the referenced second location identifier can be received in conjunction with an attempt to fulfill the first request with respect to the first location identifier, as described herein (e.g., in a scenario in which a driver is initially routed to the front entrance of a building, and then must navigate to another location in order to park and/or complete the delivery).

By way of further illustration, upon assigning the request (e.g., a food order for delivery) to a user/driver, the described technologies can route or otherwise direct the user to the location identifier associated with the request (here, location 320A, which corresponds to or is otherwise near the front/main door 330A of the building depicted in FIG. 3). It can be appreciated that upon arriving at the front of building 300 (e.g., at location 320A), a driver/user may not be able to immediately complete the delivery, etc. For example, a user driving a car that arrives at location 320A may still need to continue driving (e.g., to parking area 340A or 340B) to park his/her car prior to entering building 300. Additionally, a driver driving a truck may need to continue to parking area 340C, while a driver riding a bicycle may need to navigate to bicycle rack 340E prior to making the referenced delivery.

Accordingly, upon arriving at/in the vicinity of the referenced first location identifier (e.g., corresponding to the mailing address/front door of a building—e.g., location 320A of building 300), the described technologies can further detect or determine that the driver, user, and/or vehicle may continue moving to another location before entering the building and/or performing the referenced delivery. For example, a user driving a car that arrives at location 320A may continue driving (e.g., to parking area 340) to park his/her car prior to entering building 300. Various sensors (e.g., GPS receivers, etc.) of a device 110 can provide location identifier(s) that reflect the navigation of the user/vehicle from location 320A to another location (e.g., parking area 340A). In doing so, one or more second location identifier(s)—here, corresponding to various geographic location(s), coordinate(s), etc. that the driver traveled prior to entering building 300 to perform the reference delivery—can be determined, detected, and/or provided by device 110 and/or received by server 120.

Moreover, in certain implementations one or more second location identifier(s) can be determined, detected, and/or provided by device 110, and/or received by server 120, even after the user/driver has exited his/her vehicle and/or entered a building (e.g., building 300 as shown in FIG. 3). By way of illustration, building 300 can include various access points and/or other such communication devices 360A-360D (e.g., beacons, Bluetooth devices, etc.). Such access points can be distributed in various locations throughout building 300 (as shown) and may be perceptible to device 110 as a user walks throughout the building. Additionally, in certain implementations such access points can further enable determinations to be made with respect to the relative proximity of a device 110 to the access point. In doing so, for example, such location identifier(s)—which may correspond to locations within building 300—can reflect the locations or path that a driver or user travels as he/she delivers an item, order, etc.

For example, a user driving a car may be assigned to deliver an order to a first location such as a mailing address of building 300 as shown in FIG. 3. Upon arriving at location 320A (e.g., the front door of building 330A), the user may be unable to park, and may further navigate to parking area 340A and enter building 300 through door 330B. Based on inputs from device 110 and/or various access points 360, it can be further determined that the user walks through building 300 (e.g., a large shopping mall) until arriving at location 320C—here, the location at which the delivery is to be made.

It can be appreciated that in the above scenario, upon determining (e.g., based on the referenced location identifiers) that the delivery cannot be initiated from the front entrance of building 300, and further determining that the user walked a relatively long distance (until making the delivery at location 320C), subsequent deliveries corresponding to the referenced location 320C can be adjusted accordingly. For example, a driver being routed to deliver an item to location 320C in the future can be routed to travel via 'West Street' (as shown in FIG. 3) and park in parking are 340B. In doing so, the user can enter building 300 and perform the referenced delivery more efficiently and the recipient of the order can receive the item more quickly.

By way of further example, it can be appreciated that certain types of deliveries may need to be made in certain locations, such as freight entrances, loading docks, etc. However, the original orders/instructions—based upon which the driver is routed to the location to deliver the order—may only correspond to the mailing/street address of the building—e.g., location 320A (the front entrance of building 300 as shown in FIG. 3). Accordingly, a driver may first navigate to such a location, and only then determine the he/she must continue navigating to another location (e.g., parking area 340C—e.g., a loading dock, as shown in FIG. 3) in order to make the delivery. It can be appreciated that confusion associated with the appropriate/idea location at which to make a delivery can cause significant confusion, frustration, and inefficiency (by delaying the driver from delivering the item and the recipience from receiving it) as well as cost (e.g., in the case of unnecessary parking tickets, travel time, etc.). Accordingly, upon determining that parking area 340C is the appropriate/optimal location at which to make certain deliveries, subsequent corresponding deliveries (e.g., those requiting a loading dock) associated with the address of building 300 can be routed to area 340C initially (e.g., via 'North Road,' as shown in FIG. 3).

At operation 425, it is determined that a user has returned to the vehicle. In certain implementations, such a determination can be made based on inputs associated with various communication interfaces or connections, such as Bluetooth, Wifi, NFC, etc. (e.g., determining that a previously perceived access point or connection is present again, a previous connection has been restored, etc.).

At operation 430, the second location identifier is associated. In certain implementations, such a second identifier (e.g., the identifier received at operation 420, such as location identifier 152B, as shown in FIG. 1) is associated with the first location identifier (e.g., the location identifier received at operation 405, such as location identifier 152A, as shown in FIG. 1).

For example, as described herein, an initial request (e.g., a food order for delivery) may route a user/driver to the location identifier associated with the request (e.g., location 320A, corresponding to the front/main door 330A of building 300 in FIG. 3). However, upon detecting or determining that the driver, user, and/or vehicle continues moving to another location (associated with a second location identifier) before entering the building and/or performing the referenced delivery, such a second location identifier can be associated with the first location identifier. For example, as shown in FIG. 3, a user driving a car that arrives at location 320A may continue driving (e.g., to parking area 340) to park his/her car prior to entering building 300 in order to perform a delivery at location 320B (within the building). Accordingly, the location identifier(s) that reflect the navigation of the user/vehicle from location 320A to another location (e.g., parking area 340A)—can be associated with the original/initial location identifier associated with the order (e.g., location 320A). In doing so, subsequent corresponding deliveries (e.g., associated with location 320B— e.g., the same business within a shopping mall) can be routed to parking area 340A (e.g., via 'East Avenue'), e.g., in lieu of initially routing the driver to location 320A (e.g., the front of the building).

At operation 435, a second request is received. In certain implementations, such a second request can correspond to the first location identifier (e.g., the location identifier received at operation 405). For example, in the scenario depicted in FIG. 3, another order can be received for delivery to location 320A (e.g., the mailing address of the building shown). As noted above and described herein, while a large building may have a single mailing address, it may also have multiple entrances, and it may be more advantageous for deliveries to be made to certain entrances (which may not correspond to the mailing address as depicted in various navigation applications).

At operation 440, the second request is assigned. In certain implementations, such a request can be assigned to a driver, user, vehicle, device, etc., in order to perform the delivery, service, etc., associated with the request, as described herein. Additionally, in certain implementations the referenced request can be assigned to the referenced driver with respect to a second location identifier (e.g., the location identifier received at operation 420 and/or associated at operation 430). That is, as shown in FIG. 3, while the request may initially be received with respect to the mailing address of building 300 (which may correspond to location 320—e.g., the front door of the building), it can be determined (e.g., based on data originating from various sensors/ devices collected with respect to previous delivery instances at building 300 and stored in repository 140) that the delivery can be best completed by routing the driver to another location (e.g., to a certain parking area, entrance, etc., as described herein). Accordingly, the referenced request—e.g., an order with respect to one location identifier (e.g., the front door of building 300 in FIG. 3) can be assigned to a driver, user, etc., with respect to another location identifier (e.g., another parking area, entrance, etc., with respect to which it has been determined that the delivery can be more advantageously completed).

By way of further example, in the scenario depicted in FIG. 3, though the initial request may specify a delivery to be directed to location 320A (which may correspond to front door 330A facing 'Main Street,' as shown), based on the association (e.g., as stored in data repository 140) between the first identifier (here location 320A) and the second identifier (here, location 320B, corresponding to the actual location at which the previous order was delivered), the referenced second request can be routed to a user/driver who can be directed to location 320B (e.g., by routing the driver to travel via 'East Avenue,' park in parking lot/area 340A, and enter building 300 via entrance 330B).

Additionally, in certain implementations one or more operations can be initiated, e.g., based on the assignment of the reference request. For example, in certain implementations, various aspects of the operation of the referenced device(s), sensor(s), vehicle(s), etc., can be configured based on an assignment of the referenced request. For example, in a scenario in which various equipment may be advantageous or necessary for a particular delivery, such equipment can be initialized or prepared based on such an assignment. For example, in scenarios in which it may be most advantageous for the driver to utilize a cooler to store an item for delivery, such a cooler can be prepared (e.g., by charging it) upon assigning such a request, as described herein.

Additionally, in certain implementations the referenced request can be assigned based on various characteristics, capabilities, and/or other aspects of a driver, device, vehicle, etc. For example, upon determining that a particular delivery can be advantageously made via a loading dock (e.g., based on a determination that previous comparable deliveries are made more quickly via loading dock than others not made via loading dock), a subsequent corresponding/similar order can be assigned to a user having the permits, training, etc., to make such a delivery at a loading dock. By way of further example, upon determining that a particular delivery is best made via a loading dock, such a delivery can be assigned to a vehicle (e.g., a truck) capable of making such a delivery. It should be understood that the provided examples are intended for the purposes of illustration and that any number of other vehicle/driver/device characteristics, etc., can also be accounted/adjusted for.

At operation 445, a third request is received. In certain implementations, such a third request can include or otherwise reflect a second request identifier. Such a request identifier can include or reflect aspects of a request (e.g., an order for delivery) such as the name of the recipient (e.g., a personal or business name) and/or other aspects associated with the request. Additionally, in certain implementations the referenced request can include or otherwise reflect or correspond to the first location identifier (e.g., the location identifier received at operation 405 which may, for example, correspond to a mailing address such as location 320A as shown in FIG. 3).

By way of illustration, the referenced third request can correspond to a delivery to be directed to a particular individual or business located within building 300 shown in FIG. 3. It should be understood that though the individual/business may share the same mailing address as other individuals/businesses within the building, the location of such an individual/business may be a substantial distance from other locations within the building. For example, a delivery to an individual/business located at location 320C within building 300 can be more efficiently performed entering through entrance 330C, while a delivery to location 320B can be more efficiently performed via entrance 330B (despite the fact that both businesses may share a mailing address corresponding to building 300).

At operation 450, a third location identifier is received. In certain implementations, such a location identifier can be received in conjunction with a fulfillment of the third request (e.g., the request received at operation 445). For example, in a scenario in which a delivery is directed to a particular individual, business, etc., at a certain address (e.g., the mailing address of the building depicted in FIG. 3), various location identifiers corresponding to the fulfillment of the referenced delivery can be determined (and associated with the referenced location identifier—here the mailing address—and/or the request identifier—here the name of the individual/business).

For example, while a navigation application may initially route the driver to location 320A (here, the front door of the building, facing 'Main Street'), the driver may not be able to park there, and may thus need to continue driving towards 'West Street' and park in lot/area 340B in order to enter through entrance 330C to make the delivery to location 320C. It should be understood that the referenced determinations can be computed/determined in any number of ways using inputs from various sensors, communication interfaces, etc. For example, the location of the user can be determined based on inputs originating from a GPS receiver of device 110. Additionally, connection, disconnection, and/or perception of various WiFi, Bluetooth, etc., access points, beacons, etc. 360, can further enable determination that the user has, for example, exited his/her vehicle, entered the building, has completed the delivery and is returning to the vehicle, etc.

At operation 455, the third location identifier (e.g., as determined at operation 450) is associated. In certain implementations, such a location identifier (e.g., location identifier 152C, as shown in FIG. 1) can be associated with the first location identifier (e.g., location identifier 152A, as shown in FIG. 1) and the second request identifier (e.g., as received at operation 445, such as request identifier 154A, as shown in FIG. 1). For example, in a scenario in which a single address may be associated with multiple businesses/individuals (each of which may be positioned at different locations within a large building, etc.), the names of such individuals/businesses can be associated with specific locations and stored (e.g., in repository 140). In doing so, subsequent requests (which may indicate a delivery to be directed to a street address, e.g., location 320A as shown in FIG. 3) can be directed to the actual location of such individuals/businesses within a building, campus, etc. (e.g., locations 320B, 320C, etc., each of which may entail parking in a different lot, entering via a different entrance, etc.).

It should also be noted that while the technologies described herein are illustrated primarily with respect to the delivery of food, items, services, etc., the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 5 is a block diagram illustrating components of a machine 500, according to some example implementations, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein can be executed. The instructions 516 transform the non-programmed machine into a particular machine programmed to carry out the described and illustrated functions in the manner described. In alternative implementations, the machine 500 operates as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 can include processors 510, memory/storage 530, and I/O components 550, which can be configured to communicate with each other such as via a bus 502. In an example implementation, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 512 and a processor 514 that can execute the instructions 516. The term "processor" is intended to include multi-core processors that can comprise two or more independent processors (sometimes referred to as "cores") that can execute instructions contemporaneously. Although FIG. 5 shows multiple processors 510, the machine 500 can include a single processor with a single core, a single processor with multiple cores (e.g., a multi-core processor), multiple processors with a single core, multiple processors with multiples cores, or any combination thereof.

The memory/storage 530 can include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 can also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 can include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 can include many other components that are not shown in FIG. 5. The I/O components 550 are grouped according to functionality merely for simplifying the following discussion and the grouping is in no way limiting. In various example implementations, the I/O components 550 can include output components 552 and input components 554. The output components 552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 550 can include biometric components 556, motion components 558, environmental components 560, or position components 562, among a wide array of other components. For example, the biometric components 556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 can include acceleration sensor components (e.g., accelerometer), gravitation sensor components, rotation sensor components (e.g., gyroscope), and so forth. The environmental components 560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 550 can include communication components 564 operable to couple the machine 500 to a network 580 or devices 570 via a coupling 582 and a coupling 572, respectively. For example, the communication components 564 can include a network interface component or other suitable device to interface with the network 580. In further examples, the communication components 564 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 can be another machine or any of a wide variety of peripheral devices (e.g., a peripheral device coupled via a USB).

Moreover, the communication components 564 can detect identifiers or include components operable to detect identifiers. For example, the communication components 564 can include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 564, such as location via Internet Protocol (IP) geolocation, location via Wi-Fi® signal triangulation, location via detecting an NFC beacon signal that can indicate a particular location, and so forth.

In various example implementations, one or more portions of the network 580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 can include a wireless or cellular network and the coupling 582 can be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 can be transmitted or received over the network 580 using a transmission medium via a network interface device (e.g., a network interface component included in the communication components 564) and utilizing any one of a number of well-known transfer protocols (e.g., HTTP). Similarly, the instructions 516 can be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A method comprising:
receiving a first request corresponding to a first location identifier;
assigning the first request based on a location of a first device;
receiving, in conjunction with a fulfillment of the first request, a second location identifier;
associating the second location identifier as received in conjunction with the fulfillment of the first request with the first location identifier;
receiving a second request corresponding to the first location identifier; and
assigning the second request with respect to the second location identifier.

2. The method of claim 1, wherein receiving a second location identifier comprises receiving the second location identifier from a first sensor of the first device.

3. The method of claim 1, wherein receiving a second location identifier comprises receiving the second location identifier based on a perception of one or more access points by one or more sensors of the first device.

4. The method of claim 1, wherein receiving a second location identifier comprises receiving a plurality of location identifiers from the first device.

5. The method of claim 1, wherein assigning the second request comprises assigning the second request based on one or more characteristics of the second device.

6. The method of claim 1, wherein the first request comprises a first request identifier.

7. The method of claim 6, wherein associating the second location identifier comprises associating the second location identifier with the first location identifier and the first request identifier.

8. The method of claim 7, further comprising:
receiving a third request comprising a second request identifier and corresponding to the first location identifier;
receiving, in conjunction with a fulfillment of the third request, a third location identifier; and
associating the third location identifier with the first location identifier and the second request identifier.

9. The method of claim 1, further comprising determining, based on one or more first inputs from a sensor of the first device, that a user has exited a vehicle.

10. The method of claim 9, further comprising determining that a user has returned to the vehicle.

11. A system comprising:
a processing device; and
a memory coupled to the processing device and storing instructions that, when executed by the processing device, cause the system to perform operations comprising:

receiving a first request corresponding to a first location identifier;

assigning the first request based on a location of a first device;

receiving, in conjunction with a fulfillment of the first request and based on a perception of one or more access points by one or more sensors of the first device, a second location identifier;

associating (i) the second location identifier as received in conjunction with the fulfillment of the first request and based on the perception of the one or more access points by the one or more sensors of the first device with (ii) the first location identifier;

receiving a second request corresponding to the first location identifier; and based on (a) one or more inputs originating from one or more sensors of a second device and (b) an association, with respect to the fulfillment of the first request, of the second location identifier with the first location identifier, assigning the second request to the second device with respect to the second location identifier.

12. The system of claim 11, wherein receiving a second location identifier comprises receiving a plurality of location identifiers from the first device.

13. The system of claim 11, wherein receiving a second location identifier comprises receiving a second location identifier in conjunction with an attempt to fulfill the first request with respect to the first location identifier.

14. The system of claim 11, wherein assigning the second request comprises assigning the second request based on one or more characteristics of a vehicle associated with the second device.

15. The system of claim 11, wherein the first request comprises a first request identifier.

16. The system of claim 15, wherein associating the second location identifier comprises associating the second location identifier with the first location identifier and the first request identifier.

17. The system of claim 16, wherein the memory further stores instructions to cause the system to perform operations comprising:

receiving a third request comprising a second request identifier and corresponding to the first location identifier;

receiving, in conjunction with a fulfillment of the third request, a third location identifier; and associating the third location identifier with the first location identifier and the second request identifier.

18. The system of claim 11, wherein the memory further stores instructions to cause the system to perform operations comprising determining, based on one or more first inputs from a sensor of the first device, that a user has exited a vehicle.

19. The system of claim 18, wherein the memory further stores instructions to cause the system to perform operations comprising determining that a user has returned to the vehicle.

20. A non-transitory computer readable medium having instructions stored thereon that, when executed by a processing device, cause the processing device to perform operations comprising:

receiving a first request corresponding to a first location identifier;

assigning the first request based on a location of a first device;

receiving, in conjunction with an attempt to fulfill the first request with respect to the first location identifier and based on a perception of one or more access points by one or more sensors of the first device, a second location identifier;

associating the second location identifier as received in conjunction with the fulfillment of the first request and based on the perception of the one or more access points by the one or more sensors of the first device with the first location identifier;

receiving a second request corresponding to the first location identifier; and based on (a) one or more inputs originating from one or more sensors of a second device and (b) an association, with respect to the fulfillment of the first request, of the second location identifier with the first location identifier, initiating one or more operations associated with the second request via the second device with respect to the second location identifier.

* * * * *